United States Patent
Malet et al.

(10) Patent No.: US 9,864,186 B2
(45) Date of Patent: Jan. 9, 2018

(54) LOW OPTICAL POWER HYSTERESIS LIQUID LENSES

(71) Applicant: PARROT SA, Paris (FR)

(72) Inventors: Géraldine Malet, Villeurbanne (FR);
Stéphanie Chevalliot, Lyon (FR);
Rebecca Rabot, Lyon (FR); Benjamin Burger, Lyon (FR)

(73) Assignee: PARROT DRONES, Paris (FR)

( * ) Notice: Subject to any disclaimer, the term of this patent is extended or adjusted under 35 U.S.C. 154(b) by 0 days.

(21) Appl. No.: 14/801,346

(22) Filed: Jul. 16, 2015

(65) Prior Publication Data
US 2016/0018633 A1  Jan. 21, 2016

Related U.S. Application Data (60) Provisional application No. 62/025,172, filed on Jul. 16, 2014.

(51) Int. Cl.
*G02B 26/00* (2006.01)
*G02B 26/08* (2006.01)
*G02F 1/29* (2006.01)

(52) U.S. Cl.
CPC .................. *G02B 26/005* (2013.01)

(58) Field of Classification Search
USPC ....... 359/237, 242, 245, 246, 247, 253, 265, 359/266, 267, 272, 290, 291, 292, 296, 359/298
See application file for complete search history.

(56) References Cited

U.S. PATENT DOCUMENTS

| | | |
|---|---|---|
| 2006/0151754 A1 | 7/2006 | Choi et al. |
| 2010/0232000 A1* | 9/2010 | Futterer ............... G02B 26/005 359/9 |
| 2011/0180571 A1 | 7/2011 | Srinivasan et al. |
| 2014/0016176 A1* | 1/2014 | Kodani ............ B01L 3/502707 359/290 |

FOREIGN PATENT DOCUMENTS

| | | |
|---|---|---|
| EP | 1166157 A1 | 1/2002 |
| EP | 1 816 491 A1 | 8/2007 |
| WO | 00/58763 A1 | 10/2000 |
| WO | 2004/099846 A1 | 11/2004 |
| WO | 2010/015691 A1 | 2/2010 |

OTHER PUBLICATIONS

Raj, B. et. al. (2009). Ion and Liquid Dependent Dielectric Failure in Electrowetting Systems. Langmuir Article, 25(11), 6162-6167 (6 pages).
European Search Report and Annex to the European Search Report issued in corresponding European Patent Application No. EP 15 17 6956, dated Nov. 10, 2015 (2 pages).

* cited by examiner

*Primary Examiner* — Brandi N Thomas
(74) *Attorney, Agent, or Firm* — Osha Liang LLP (57) ABSTRACT

An electrowetting optical device including a conductive liquid and a non-conductive liquid, the liquids being non miscible, and a dielectric enclosure on which both fluids are in contact and form a triple interface. The non-conductive liquid includes from 0.0001 weight percent to 1 about weight percent of a surface adsorbing agent. The surface adsorbing agent is an amphiphilic molecule having a solubility in water lower than 0.1 about weight percent at 25° C.

13 Claims, 5 Drawing Sheets

WFE rms : wave front error – root mean square (optical quality of the electrowetting device)

FIGURE 10

WFE rms : wave front error – round mean square (optical quality of the electrowetting device)

LOW OPTICAL POWER HYSTERESIS LIQUID LENSES

CROSS-REFERENCE TO RELATED APPLICATIONS

The present application claims benefit to U.S. Provisional Application No. 62/025,172 filed on Jul. 16, 2014, titled, "LOW OPTICAL POWER HYSTERESIS LIQUID LENSES." The contents of the priority application is incorporated by reference in its entirety.

TECHNICAL FIELD

The present disclosure relates to an electrowetting optical device having reduced optical power hysteresis. The present disclosure also relates to a method for reducing optical power hysteresis of an electrowetting optical device. The present disclosure also relates to liquid lenses comprising said electrowetting optical device and apparatuses comprising said liquid lenses.

BACKGROUND

Electrowetting based liquid lenses are well known and several patents cover their general description and applications (see, for example, patent EP 1 816 491 A1 and patent EP 1 166 157 A1). The electrowetting based liquid lenses described in these patent applications, as in all current commercial applications, are based on the formulation of two phases, namely a non-conductive phase (i.e. an oil) and a conductive phase, the oil and the conductive phase being generally non-miscible and forming a triple interface on an insulating substrate comprising a dielectric material. In patent EP 1 816 491 A1, the oil comprises carbon, silicon or germanium based monomers, oligomers or homopolymers, and the conductive phase is an aqueous formulation based on water, polar organic compounds and salts. In patent EP 1 166 157 A1, the oil comprises alcanes which may be halogenated.

Prior arts have shown that the contact angle of the oil on the insulating substrate in the presence of the conductive phase should be below 20° to provide electrowetting based liquid lenses with acceptable optical power hysteresis (see, for example, patent EP 1 816 491 A1 and Langmuir 2009, 25(11), 6162-6167). However, oil formulations having a contact angle lower than 20° on the insulating substrate in the presence of the conductive phase are often unachievable and result in liquid lenses having high optical power hysteresis and poor optical qualities. As a consequence of physical observation of required contact angles, efforts have been focused on providing liquid formulations of the oil comprising generally 20 weight percent or more of a wetting agent having a contact angle lower than 20° on the insulating substrate. For example, the wetting agents described in patent EP 1 816 491 A1 are hydrophobic molecules such as halogenated alkanes, halogenated aromatic molecules, alkylhalogenated aromatic molecules, aromatic germanium compounds, and aromatic silicium compounds.

Patent US 2006/151754 A1 and patent WO 2010/015691 A1 describe the use of surfactants in the liquid formulations to reduce interfacial tension between the oil and the conductive phase, the reduction of interfacial tension allowing reduction of the driving voltage of the lenses. In patent US 2006/151754 A1, the surfactants described are anionic, cationic or non-ionic molecules. In patent WO 2010/015691 A1, the surfactants described are non-ionic species such as ethoxylated fatty alcohols, polypropylene glycols or polyethylene glycols.

Patent WO 2004/099846 A1 describes a switchable element where the spatial distribution of two immiscible fluids is controlled by the application of a voltage. A "surfactant" is added to at least one of the liquids in order to achieve proper spatial distribution of the liquids. The "surfactant" described in patent WO 2004/099846 A1 may be a hydrophobic small molecule such as pentafluorophenyltrimethylsilane.

However, it is not always possible to design oil formulations with a substantial amount, such as 20 weight percent or more, of a component, such as a wetting agent, having a contact angle lower than 20° on the insulating substrate in the presence of the conductive phase.

Figure 1:
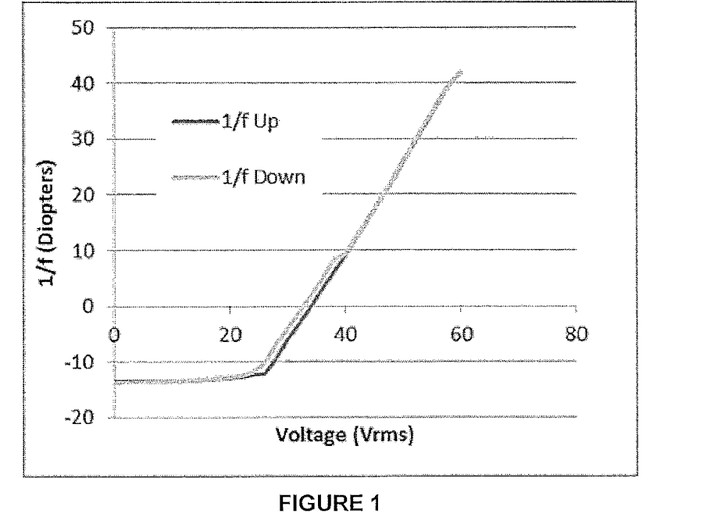
FIG. 1 shows optical performance degradation of electrowetting based liquid lenses according to the prior art (already described).

Moreover, the prior art compositions comprising a substantial amount of a component having a contact angle below 20° on the insulating substrate may result in electrowetting-based liquid lenses which do not age well. For instance, after application of 40V AC 1 kHz for long times at a high service temperature, some lenses will show a drift of performance, as shown in FIG. 1. Accordingly, there exists a continuing need to provide highly reliable electrowetting optical devices with improved, stable and long-lived optical performances.

SUMMARY

An object of the present disclosure is to provide electrowetting optical devices having reduced optical power hysteresis. Another object of the present disclosure is to provide electrowetting optical devices having improved wetting of the non-conductive liquid onto the dielectric enclosure surface. Another object of the present disclosure is to provide electrowetting optical devices having improved optical quality, stability and longevity.

According to a first aspect, the above-mentioned objects, as well as further advantages, are achieved by an electrowetting optical device comprising a conductive liquid and a non-conductive liquid, said liquids being non miscible; and a dielectric enclosure on which both fluids are in contact and form a triple interface, wherein the non-conductive liquid comprises from 0.0001 weight percent to about 1 weight percent of a surface adsorbing agent, the surface adsorbing agent being an amphiphilic molecule having a solubility in water lower than about 0.1 weight percent at 25° C.

According to a second aspect, one or more of the above-mentioned objects may be achieved by a liquid lens comprising the electrowetting optical device according to the first aspect.

According to a third aspect, one or more of the above-mentioned objects may be achieved by an apparatus comprising the liquid lens according to the second aspect.

According to a fourth aspect, one or more of the above-mentioned objects may be achieved by a method for reducing optical power hysteresis of an electrowetting optical device comprising a conductive liquid and a non-conductive liquid, said liquids being non miscible, and a dielectric enclosure on which both fluids are in contact and form a triple interface, the method comprising: decreasing the interface energy between the non-conductive fluid and the dielectric enclosure by adding from 0.0001 weight percent to about 1 weight percent of a surface adsorbing agent to the non-conductive fluid, the surface adsorbing agent being an amphiphilic molecule having a solubility in water lower than about 0.1 weight percent at 25° C.

According to a fifth aspect, one or more of the above-mentioned objects may be achieved by use of a non-conductive liquid as a component of an electrowetting optical device, the non-conductive liquid comprising from 0.0001 weight percent to about 1 weight percent of a surface adsorbing agent, the surface adsorbing agent being an amphiphilic molecule having a solubility in water lower than about 0.1 weight percent at 25° C.

Other aspects and advantages of the present disclosure will be apparent from the following description, figures, and appended claims.

BRIEF DESCRIPTION OF DRAWINGS

The present invention will be better understood and other advantages and embodiments will become clear on reading the description that follows, given purely by way of indication and in no way limiting, and by referring to the appended Figures in which.

DETAILED DESCRIPTION OF EMBODIMENTS

Embodiments of the present disclosure will now be described in detail with reference to the accompanying figure. In the following detailed description of embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

Herein, the words "comprise/comprising" are inclusive or open-ended and do not exclude additional, non-recited elements. Further, herein the term "about" and "substantially" are synonymous with (means the same thing as) a 20% margin, and preferably 10% margin, of the respective value.

In the following, it is meant by "organic compound" a chemical compound consisting mainly of carbon and hydrogen, which may comprise other elements such as oxygen, nitrogen, sulfur and phosphorus, except elemental carbon, carbonates, carbon oxide and carbon cyanide molecules. In the following, it is meant by "inorganic compound" a chemical compound that is not considered "organic". In the following, it is meant by "ionic compound" a chemical compound in which ions are held together by at least one ionic bond. In the following, it is meant by "non-ionic compound" a chemical compound that is not considered "ionic". In the following, it is meant by "oligomer" a compound having 2 to 20 identical (homo-oligomers) or different (co-oligomers) repeating units. In the following, it is meant by "polymer" a compound having more than 20 identical (homo-polymers) or different (co-oligomers/polymers) repeating units. In the following, it is meant by "conductive" electrically conductive. In the following, it is meant by "non-aqueous conductive liquid" the fact that water is not the main constituent (w./w.) of the conductive liquid. In the following, it is meant by "adsorption" a process of linking molecules onto a solid surface through grafting or physisorption. In the following, it is meant by "grafting" a process of linking molecules onto a solid surface by covalent binding. In the following, it is meant by "physisorption" a process of linking molecules onto a solid surface, involving hydrogen bonding, electrostatic interaction and/or van der Waals forces. In the following, it is meant by "surface adsorbing agent" a compound configured to be adsorbed on a surface, such as on the surface of the dielectric enclosure. In the following, it is meant by "amphiphilic" a molecule possessing both hydrophilic (e.g. polar) and lipophilic (non-polar) moieties or properties. Hysteresis is meant to be the difference in response whether the controlling parameter is driven with increasing values or decreasing values.

Figure 2:
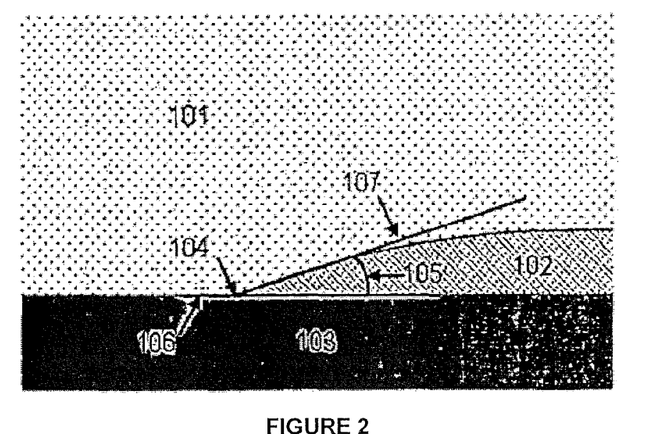
FIG. 2 is a schematic view of the natural angle of a non-conductive liquid on the surface of an insulating substrate in presence of a conductive liquid (prior art).

In the present disclosure, the contact angle θ (numerical reference 105 as shown in FIG. 2) is the angle formed between the tangent (106) to a dielectric enclosure such as in the form of a planar insulating substrate (103) and the tangent (107) to the surface of the non-conductive fluid (102), both measured at the point of the triple interface (104) and in presence of the conductive liquid (101).

When no voltage is applied, the contact angle referred to as $\theta_{(0)}$ relies on the Young equation:

$\gamma_{conductive\ liquid/dielectric} = \gamma_{non-conductive\ liquid/dielectric} + \cos\theta \cdot \gamma_{non-conductive\ liquid/conductive\ liquid}$, wherein $\gamma_{i/j}$ is the interfacial energy between a phase i and a phase j.

$\theta_{(V)}$ is the contact angle of the oil phase on the dielectric surface at the voltage V. In the following, it is understood that a contact angle θ at an unspecified voltage is the contact angle $\theta_{(0)}$ (i.e. recorded at 0 V).

As it is well known, the contact angle $\theta_{(0)}$ of two immiscible fluids on a solid surface is an intrinsic property of the materials and does not depend on the geometry of the device. It is usually measured on flat substrates, at a reference temperature (for example, room temperature, say between about 20° C. and about 25° C. such as at 22° C.).

Figure 3:
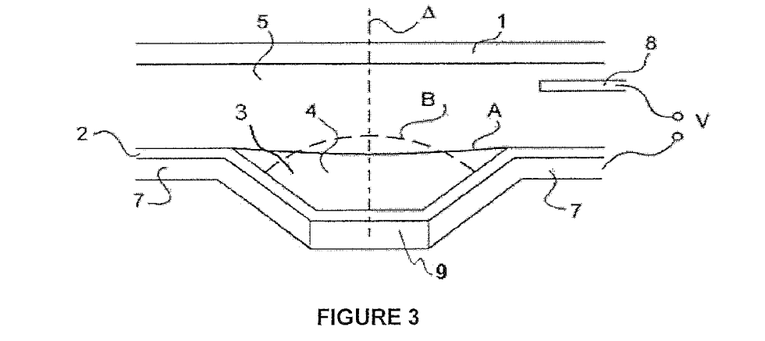
FIG. 3 is a simplified cross-section view of an exemplary electrowetting optical device according to the present disclosure (prior art).

FIG. 3 shows a simplified cross-section view of an exemplary electrowetting optical device according to the present disclosure. An electrowetting optical device may comprise a cell—defined by a cell casing comprising an insulating plate 1 (i.e. the higher plate in FIG. 3), side walls (not shown), and a dielectric enclosure (for example in the form of an insulating substrate, which may be made planar in other embodiments) 2—which contains a conductive liquid 5 and a non-conductive liquid 4, the dielectric enclosure 2 having for example a low wettability with respect to the conductive liquid 5 (e.g. hydrophobic). For example, the dielectric enclosure 2 may be non-planar, may comprise a conical or cylindrical depression 3 (i.e. recess, hollow) centered around an axis Δ perpendicular to the plate, and/or may comprise a drop of the non-conductive liquid 4. In FIG. 3, the exemplary depression 3 is a truncated cone. The remainder of the cell may be filled with the conductive liquid 5, non-miscible with the non-conductive liquid 4. For example, the non-conductive liquid and the conductive liquid may have a different refractive index and may have substantially the same density. As shown in this example, the dioptre formed between liquids 4 and 5 forms a surface, the optical axis of which is axis Δ and the other surface of which corresponds to the contact between the drop and the bottom of the hollow. While an electrode 7 such as an annular electrode may be positioned on the external surface of dielectric enclosure, another electrode 8 may be in contact with the conductive liquid 5. In this example, reference numeral 9 indicates a glass or plastic wall. A voltage source (not shown) enables application of an alternative current (i.e. AC) voltage V between electrodes 7 and 8. The dielectric enclosure 2 usually comprises or is made of a transparent material coated with a material that is hydrophobic.

The Applicant has found that non-conductive liquids according to the present disclosure provide highly reliable electrowetting optical devices. Indeed, these non-conductive liquids comprise a surface adsorbing agent which ensures a higher reliability compared to non-conductive phases of the prior art. More specifically, the present disclosure relates to the use of small amounts (e.g. no more than about 1 weight percent) of a particular additive, namely a surface adsorbing agent, in the non-conductive liquid to improve the non-conductive liquid wetting onto the surface of the dielectric enclosure. As a result, electrowetting optical devices and liquid lenses according to the present disclosure have reduced optical power hysteresis, reduced contact angle hysteresis, improved optical quality, improved optical stability and improved longevity. In the following, optical power hysteresis and contact angle hysteresis are hysteresis observed when subjecting the electrowetting optical device to a voltage ramp up, then down (e.g. from 0V to 60V then back down to 0V), as shown in accompanying FIGS. 4 to 10.

According to a first aspect of the present disclosure, an electrowetting optical device may comprise a conductive liquid and a non-conductive liquid, said liquids being non miscible; and a dielectric enclosure on which both fluids are in contact and form a triple interface, wherein the non-conductive liquid comprises from 0.0001 weight percent to about 1 weight percent of a surface adsorbing agent, the surface adsorbing agent being an amphiphilic molecule having a solubility in water lower than about 0.1 weight percent at 25° C. Preferably, the non-conductive liquid comprises from 0.005 weight percent to about 0.5 weight percent of the surface adsorbing agent.

Indeed, the Applicant has found that adding a small amount, such as from 0.0001 weight percent to about 1 weight percent, of a surface adsorbing agent, which is an amphiphilic molecule having a solubility in water lower than about 0.1 weight percent at 25° C., in the non-conductive liquid, provides many beneficial effects as described herein below.

First, the surface adsorbing agent may provide significant decrease of optical power hysteresis of the electrowetting optical device and/or prevent a drift of the optical power causing hysteresis during aging of the electrowetting optical device. For example, the surface adsorbing agent may be configured to decrease the interfacial energy between the non-conductive liquid and the dielectric material. For example, at a service concentration of only about 0.0001 weight percent to about 1 weight percent, the surface adsorbing agent may decrease the optical power hysteresis of the liquid lenses. Also, at a service concentration of only about 0.0001 weight percent to about 1 weight percent, the surface adsorbing agent may allow low optical power hysteresis liquid lenses, even with contact angles $\theta_{(0)}$ higher than 20°. Indeed, the contact angle $\theta_{(0)}$ is not required to be substantially modified or lowered below 20° to provide electrowetting optical device with low optical power hysteresis. In addition, as the amount of the surface adsorbing agent is low (e.g. less than 1 weight percent), the density, the viscosity and the optical index of the non-conductive liquid may remain substantially unchanged in the presence of the surface adsorbing agent.

Second, the surface adsorbing agent may form a protective layer on the dielectric enclosure. As a result, the optical stability and durability of the liquid lens may be improved. Indeed, the surface adsorbing agent may allow stable optical performance through formation of a protective layer onto the dielectric. For example, the surface adsorbing agent may adsorb at the interface between the non-conductive liquid and the dielectric material. Without application of voltage on the electrowetting optical device, the non-conductive liquid may totally wet (i.e. cover) the surface of the dielectric enclosure. With an applied voltage, the dielectric enclosure surface may be uncovered by the non-conductive liquid but the dielectric enclosure may not be directly in contact with the conductive liquid because of the presence of a layer of the surface adsorbing agent on the surface of the dielectric enclosure. As a result, the dielectric enclosure may not age and an electrowetting optical device with improved and stable optical performances may be obtained.

Third, the surface adsorbing agent may provide improved control of the contact angle $\theta_{(0)}$ of the non-conductive liquid on the surface of the dielectric enclosure. For example, in one or more embodiments, the surface adsorbing agent may be configured to decrease by at least 5° the contact angle θ of the non-conductive liquid on the surface of the dielectric enclosure in the presence of the conductive liquid. In one or more embodiments, the surface adsorbing agent may be configured to decrease by at least 10° the contact angle θ of the non-conductive liquid on the surface of the dielectric enclosure.

In one or more embodiments, the surface adsorbing agent according to the present disclosure may be identified through a first reference contact angle experiment on a flat substrate. The first reference experiment consists in measuring the contact angle $\theta_{(O)}$ of a reference non-conductive liquid, in the presence of a reference immiscible conductive liquid, on a reference insulating surface. For example, the reference non-conductive liquid may be phenyltrimetylsilane, the reference conductive liquid may be ethylene glycol and the reference insulating surface may be parylene C, the reference contact angle of the non-conductive liquid on the insulating surface in these conditions being of about 23° (i.e. when the non-conductive liquid does not comprise a surface adsorbing agent).

In one or more embodiments, the surface adsorbing agent according to the present disclosure may be identified through a second reference contact angle experiment. The second reference experiment consists in depositing a drop of the non-conductive liquid containing 0.0001 to about 1 weight % of the surface adsorbing agent on the dielectric enclosure in the presence of the conductive fluid; recording a contact angle hysteresis (by applying a voltage ramp up, then down) before continuous application of a voltage between the conductive liquid and an electrode placed under the dielectric enclosure; continuously applying an AC 1 kHz square voltage for at least 24 h between the conductive liquid and the electrode, said voltage being chosen in the operating voltage range of the electrowetting device to induce a variation of at least 20° of the contact angle; and recording a contact angle hysteresis (by applying a voltage ramp up, then down) after the continuous application of the voltage, wherein a difference between the contact angle hysteresis before and after application of the voltage is lower than 5°, and preferably lower than 4° such as for example lower than 3°. For example, the chosen voltage may range from about 20V to about 60V, and preferably from about 30V to 55V.

For example, a surface adsorbing agent according to the present disclosure may be identified when the surface adsorbing agent decreases the contact angle of a non-conductive liquid in the reference contact angle experiment described above when added to the reference non-conductive liquid in a concentration of 1 weight % or less. In one or more embodiments, the contact angle of the mixture surface adsorbing agent (1 weight % maximum)/non-conductive liquid is lower than 18°. In one or more preferred embodiment, the contact angle of the mixture surface adsorbing agent (1 weight % maximum)/non-conductive liquid is lower than 13°.

In one or more embodiments, a surface adsorbing agent according to the present disclosure, which may be identified according to the reference contact angle experiment defined above, may be added to a non-conductive fluid formulation in a concentration from 0.0001 weight percent to about 1 weight percent. For example, a surface adsorbing agent according to the present disclosure, which may be identified according to the reference contact angle experiment defined above, may be added to a non-conductive liquid other than pure phenyltrimethylsilane.

In one or more embodiments, the surface adsorbing agent may be selected from the group consisting of dialkylsiloxane polymers, dialkylsiloxane copolymers, polyethoxylated alkylphenols (e.g. ethoxylated nonylphenols), polyol fatty acid esters, C8 to C18 fatty alcohols, polyethoxylated fatty alcohols, dialkyl sodium sulfosuccinates (e.g. aerosol OT®), glycerophospholipids (e.g. lécithine), di-(carboethyl) hydroxyethyl methylammonium methosulfates, fattyacid monoethanolamides, fattyacid diethanolamides and mixtures thereof.

In one or more embodiments, the dialkylsiloxane polymer and/or the dialkylsiloxane copolymer may comprise more than 20 dialkylsiloxane units. In one or more embodiment, the dialkylsiloxane polymer and/or the dialkylsiloxane copolymer may have a molecular weight ranging from about 3000 g/mol to about 15000 g/mol. In one or more embodiment, the dialkylsiloxane polymer and/or the dialkylsiloxane copolymer may have a molecular weight ranging from about 8000 g/mol to about 12000 g/mol. In one or more embodiments, the alkyl groups of the dialkylsiloxane may be identical or different and comprise less than 12 carbon atoms. In one or more embodiments, the alkyl groups of the dialkylsiloxane may be identical or different and comprise less than 10 carbon atoms. In one or more embodiments, the alkyl groups of the dialkylsiloxane may be identical or different, saturated or unsaturated, and linear, cyclic or branched hydrocarbon groups. In one or more embodiments, the surface adsorbing agent may be selected from the group consisting of a polydimethylsiloxane-polyethyleneoxide copolymer, a polyalkylmethylsiloxane-hydroxypoly(alkyleneoxy)propylmethylsiloxane copolymer, a polydimethylsiloxane-hydroxypoly(ethyleneoxy)propylmethylsiloxane copolymer, a polydimethylsiloxane-methoxypoly(ethyleneoxy)propylmethylsiloxane copolymer, a polydimethylsiloxane-alcoxypoly(ethyleneoxy)propylmethylsiloxane copolymer, a polydimethysiloxane-poly aminopropylmethylsiloxane copolymer, a hydroxyl terminated polydimethylsiloxane polymer, a hydroxyl terminated polydimethylsiloxane-polyalkylmethylsiloxane copolymer, a hydroxyl terminated polydimethylsiloxane-polydiphenylsiloxane copolymer, and a mixture thereof. In one or more embodiments, the polydimethylsiloxane-polyethyleneoxide copolymer may comprise from about 20 to about 30 weight percent of non-dimethylsiloxane monomer. In one or more embodiments, the surface adsorbing agent may be a polydimethylsiloxane-methoxypolyethyleneoxypropylmethylsiloxane copolymer. In one or more embodiments, the polydimethysiloxane-poly(aminopropylmethylsiloxane) copolymer may comprise from about 2 to about 6 molar percent of aminopropylmethylsiloxane monomers. In one or more embodiments, the hydroxyl terminated polydimethylsiloxane-polydiphenylsiloxane copolymer may comprise from about 14 to about 18 molar percent of polydiphenylsiloxane monomers. In one or more embodiments, the dialkylsiloxane polymer or dialkylsiloxane copolymer may comprise no more than 30 weight percent, and preferably from about 15 to about 30 weight percent, of non dialkylsiloxane units. In one or more embodiments, the dialkylsiloxane copolymer may comprise from about 15 to about 30 weight percent, of non dialkylsiloxane units. In one or more embodiments, the dialkylsiloxane copolymer may comprise from about 14 to about 18 weight percent of polydiphenylsiloxane units. In one or more embodiments, the dialkylsiloxane copolymer may comprise from about 3 to about 5 weight percent of aminopropylmethylsiloxane units.

In one or more embodiments, the polyethoxylated fatty alcohol may comprise from about 1 to about 8 ethoxy units. In one or more embodiment, the polyethoxylated fatty alcohol may have a molecular weight ranging from about 200 g/mol to about 500 g/mol. In one or more embodiment, the polyethoxylated fatty alcohol may comprise a C16-C18 fatty alcohol moiety. In one or more embodiment, the fatty alcohol moiety may be saturated or unsaturated and be a linear or branched hydrocarbon group. In one or more embodiment, the polyethoxylated fatty alcohol may be a polyethoxylated nonylphenol.

In one or more embodiments, the polyol fatty acid ester may have a molecular weight ranging from about 400 g/mol to about 1500 g/mol. In one or more embodiment, the polyol fatty acid ester may comprise 2 or more ester units. In one or more embodiment, the polyol fatty acid ester may comprise 2 or more C16-C22 fatty acid moieties. In one or more embodiment, the fatty acid moiety may be saturated or unsaturated and be a linear or branched hydrocarbon group.

In one or more embodiments, the polyol fatty acid ester may be a sorbitan fatty acid ester and/or a polyol of a C16-C22 fatty acid.

In one or more embodiments, the 08 to C18 fatty alcohol may be saturated or unsaturated and be a linear or branched hydrocarbon group. In one or more embodiment, the C8-C18 fatty alcohol may be fluorinated or perfluorinated. In one or more embodiment, the C8 to C18 fatty alcohol may be a 010 to C16 fatty alcohol. In one or more embodiment, the C8 to C18 fatty alcohol may be a dodecanol such as dodecan-1-ol. In one or more embodiment, the C8 to C18 fatty alcohol may be a perfluorododecanol such as perfluorododecan-1-ol. In one or more embodiment, the linear formula of the C8-C18 fatty alcohol may be $C_8F_{17}CH_2CH_2OH$.

In one or more embodiments, the surface adsorbing agent may be Coconut oil fatty acid ethanolamide. In one or more embodiment, the surface adsorbing agent may be a di-(carboethyl) hydroxyethyl methylammonium methosulfate such as di-(Palm carboxyethyl) hydroxyethyl methylammonium methosulfate.

The non-conductive liquid may comprise a Si-based monomer, oligomer, and/or polymer, a Ge-based monomer, oligomer and/or polymer, a Si—Ge-based monomer, oligomer and/or polymer, a hydrocarbon, or any combination thereof as described in patent EP 1 816 491 A1, which is hereby incorporated by reference.

The hydrocarbon may be cyclic, linear or branched. The hydrocarbon may be saturated or unsaturated. The hydrocarbon may be aromatic or non-aromatic. For example, the hydrocarbon may have from 6 to 20 carbon atoms. The hydrocarbon may further comprise one or more heteroatoms, as substituents and/or as atoms or groups of atoms interrupting the hydrocarbon chain and/or ring. Such heteroatoms comprise, but are not limited to oxygen, sulfur, nitrogen, phosphor, halogens (mainly as fluorine, chlorine, bromine and/or iodine).

In addition to the surface adsorbing agent, the non-conductive liquid may comprise at least one fluid. For example, the non-conductive liquid may comprise one or several of the following silicon-based compounds or fluids:

a siloxane of the formula 1a, 1b or 1c:

wherein each of R1, R2 and R' independently represents alkyl, (hetero)aryl, (hetero)arylalkyl, (hetero)arylalkenyl or (hetero)arylalkynyl and n is comprised between about 1 and about 20, such as for example between about 1 and about 10 (in one or more embodiments, n may be 1, 2, 3, 4 or 5 and with the precision that n is greater than 2 in formula 1c);

a silane of formula 2:

wherein R1, R2 and R' are as defined above and m is comprised between about 1 and about 20, such as for example between about 1 and about 10 (in one or more embodiments, m may be 1, 2 or 3);

a monosilane of formula 3:

wherein R1 and R2 are as defined above, and each of R3 and R4 independently represents alkyl, (hetero)aryl, (hetero)arylalkyl, (hetero)arylalkenyl or (hetero)arylalkynyl.

In one or more embodiments, in the above formulae 1a, 1b and 2, all R' may be identical or different. For example, R' may be methyl or halogenated alkyls. In one or more embodiment, in the above formulae 1a, 1b and 2, all R' are the same. In one or more embodiment, each R' may be methyl. For example, the non-conductive liquid may comprise one or several of the following specific silicon-based species: hexamethyldisilane, hexaethyldisilane, diphenyldimethylsilane, chlorophenyltrimethylsilane, phenyltrimethylsilane, phenethyltris(trimethylsiloxy)silane, phenyltris(trimethylsiloxy)silane, polydimethylsiloxane, tetraphenyltetramethyltrisiloxane, poly(3,3,3-trifluoropropylmethylsiloxane), 3,5,7-triphenylnonamethylpentasiloxane, 3,5-diphenyloctamethyltetrasiloxane, 1,1,5,5-tetraphenyl-1,3,3,5-tetramethyltrisiloxane, and hexamethylcyclotrisiloxane. In one or more embodiment, non-conductive liquid may comprise one or several of the following specific silicon-based species: hexamethyldisilane, hexaethyldisilane, diphenyldimethylsilane, phenyltris(trimethylsiloxy)silane and polydimethylsiloxane such as DMS-T12 from Gelest®, which is trimethylsiloxy terminated polydimethylsiloxane. In one or more embodiment, the non-conductive liquid may comprise hexamethyldisilane and/or hexaethyldisilane. According to these embodiments, aliphatic silanes like hexamethyldisilane and hexaethyldisilane may provide a low solubility of the insulating fluid in the conductive liquid.

The non-conductive liquid may comprise one or several of the following germane based species: —a germanoxane of formula 4, —a germane of formula 5, —a germane of formula 6:

wherein R', R1, R2, R3, R4 and n are as defined above.

The non-conductive liquid may comprise one or several of the following specific germane based species: hexamethyldigermane, hexaethyldigermane, diphenyldimethylgermane, phenyltrimethylgermane. In one or more embodiment, the non-conductive liquid may comprise hexamethyldigermane and/or hexaethyldigermane. According to these embodiments, the use of a germane according to the present disclosure, such as hexamethyldigermane and hexaethyldigermane, may provide a non-conductive liquid having a density particularly adapted to the density of the conductive liquids according to the present disclosure. According to another feature, hexamethyldigermane and hexaethyldigermane may provide a low solubility of the insulating fluid in the conductive liquid.

According to the present disclosure, the conductive liquid may be an aqueous or a non-aqueous conductive liquid.

In one or more embodiments, the conductive liquid may comprise water. In one or more embodiments the conductive liquid may comprise at least 51 weight percent of water. In one or more embodiments, the conductive liquid may comprise water and from about 0.0001 weight percent to about 10 weight percent of at least one salt. For example the salt may be a monovalent or a multivalent salt such as an organic or inorganic compound being totally or substantially hydrolysable into a cation, di-cation or a tri-cation. For example, the salt may comprise a metal selected from the group comprising alkali metals, alkaline-earth metals, transition metals, lanthanides, as well as mixtures thereof. For example, the salt may comprise one or more halide (e.g. F$^-$, Cl$^-$, Br$^-$, I$^-$) and/or one or more carboxylates (e.g. (R(COO$^-$)$_n$, where n=1-3, and where R is a C1-C10 linear, branched or cyclic alkyl group) and/or one or more inorganic acid salts (e.g. sulfate, phosphate, etc.). In one or more embodiments, the conductive liquid may comprise water, the at least one salt and at least one non-ionic polar solvent. For example, the non-ionic polar organic solvent may comprise, and for example consists of, carbon, hydrogen, nitrogen, phosphorus, sulfur and oxygen atom(s). In one or more embodiments, the non-ionic polar organic solvent may comprise at least two carbons and/or at least one and preferably at least two hydroxyl (—OH) functions. In one or more embodiments, the non-ionic polar organic solvent may comprise 4 carbons or less.

According to the present disclosure, the non-aqueous conductive liquid may comprise the non-ionic polar organic solvent and at least 2 weight % of a first compound (with respect to the total weight of the non-aqueous conductive liquid; i.e. w./w.). In one or more embodiments, the non-aqueous conductive liquid may comprise at least 51 weight % of the non-ionic polar organic solvent. In one or more embodiments, the non-aqueous conductive liquid may comprise at least 4 weight % of the first compound. In one or more embodiments, the non-aqueous conductive liquid may comprise at least 10 weight % of the first compound. In one or more embodiments, the non-aqueous conductive liquid comprises less than about 5 weight % of water. In one or more embodiments, the non-aqueous conductive liquid comprises less than about 1 weight % of water. For example, the non-ionic polar organic solvent may be selected from the group comprising ethane-1,2-diol ethylene glycol), propane-1,3-diol trimethylene glycol), propane-1,2-diol (i.e. propylene glycol), propane-1,2,3-triol (i.e. glycerol), and any combination thereof. In one or more embodiments, the non-aqueous conductive liquid is ethane-1,2-diol and/or propane-1,3-diol.

The first compound is either ionic or non-ionic and is comprised in the non-aqueous conductive liquid in an amount of at least 2 weight %. In one or more embodiments, the first compound may be present in the non-aqueous conductive liquid in an amount of at least 4 weight %. In one or more embodiments, the first compound may be present in the non-aqueous conductive liquid in an amount of at least 10 weight %. In one or more embodiments, the first compound is a compound other than the non-aqueous conductive liquid. In one or more embodiments, the first compound is non-aqueous (i.e. not water). The first compound may be either organic or inorganic. In one or more embodiments, if the first compound is ionic, the non-aqueous conductive liquid may comprise at least 4 weight % of the first compound. In one or more of these embodiments, the first compound may be ionic and organic, such as, for example, a metal carboxylate. In one or more embodiments, if the first compound is non-ionic, the non-aqueous conductive liquid may comprise at least 10 weight % of the first compound. According to these embodiments, the first compound provides freezing point decrease to the non-aqueous conductive liquid. According to these embodiments, the first compound may also enhance the non-miscibility between the non-conductive liquid and the non-aqueous conductive liquid.

In one or more embodiments, the first compound may be an ionic compound. For example, the first compound may comprise one or more metal or ammonium halide, one or more metal or ammonium carboxylate, one or more metal or ammonium sulfate, one or more metal or ammonium tetrafluoroborate, one or more metal or ammonium carbonate, one or more metal or ammonium nitrate, one or more metal or ammonium methylsulfonate, or any combination thereof. For example, the halide may be selected from the group comprising fluoride, chloride, bromide, iodide, and any combination thereof. In one or more embodiments, the ammonium may be $NH_4^+$. In one or more embodiments, the halide may be selected from the group comprising chloride, bromide, iodide, and any combination thereof. For example, the metal may be selected from the group comprising alkali metals, alkaline earth metals, transition metals, post-transition metals, lanthanides, and any combination thereof. For example, the metal may be selected from the group comprising lithium, sodium, potassium, calcium, zinc, and any combination thereof. For example, the carboxylate may be selected from the group comprising formate, acetate, trifluoroacetate, oxalate, succinate, and any combination thereof. In one or more embodiments, the ionic compound may be selected from the group comprising potassium acetate, sodium acetate, potassium trifluoroacetate, sodium trifluoroacetate, lithium bromide, potassium bromide, sodium bromide, calcium chloride, and any combination thereof. According to these embodiments, the first compound provides a salting out effect as well as an increase in polarity effect of the non-aqueous conductive liquid and further enhances the non-miscibility between the non-conductive liquid and the non-aqueous conductive liquid.

In one or more embodiments, if the first compound is non-ionic, the first compound may be more polar than the non-aqueous conductive liquid, the polarity of the non-ionic first compound being measured by Hansen parameters, the first compound having a sum of Hansen parameter for polarity ($\delta p$) and Hansen parameter for hydrogen bonding ($\delta h$) higher than the sum of the corresponding Hansen parameters of the non-aqueous conductive liquid. Hansen parameters of the first compound and of the non-aqueous conductive liquid may be provided by known tables and methods, such as the method described in Hansen's book: Hansen Solubility Parameters, a user's handbook, Charles M. Hansen, CRC Press 2000, which is hereby incorporated by reference. In one or more embodiments, the first compound may be a non-ionic compound selected from the group comprising glycerol, ethylene glycol, formamide, ethanolamine, lactic acid, triethanolamine, urea, and any combination thereof. In one or more embodiments, the non-ionic compound may comprise glycerol and/or ethylene glycol. According to these embodiments, the first compound provides an increase in polarity of the non-aqueous conductive liquid and further enhances the non-miscibility between the non-conductive liquid and the non-aqueous conductive liquid.

In one or more embodiments, the non-aqueous conductive liquid may comprise at least one ionic compound to ensure improved electric conductivity of the non-aqueous conductive liquid. Accordingly, in one or more embodiments, if the first compound is non-ionic, the non-aqueous conductive liquid may comprise a second compound, the second compound being an ionic compound. For example, the second compound may comprise one or more metal or ammonium halide, one or more metal or ammonium carboxylate, one or more metal or ammonium sulfate, one or more metal or ammonium tetrafluoroborate, one or more metal or ammonium carbonate, one or more metal or ammonium nitrate, one or more metal or ammonium methylsulfonate, or any combination thereof. For example, the halide may be selected from the group comprising fluoride, chloride, bromide, iodide, and any combination thereof. In one or more embodiments, the ammonium may be $NH_4^+$. In one or more embodiments, the halide may be selected from the group comprising chloride, bromide, iodide, and any combination thereof. For example, the metal may be selected from the group comprising alkali metals, alkaline earth metals, transition metals, post-transition metals, lanthanides, and any combination thereof. For example, the metal may be selected from the group comprising lithium, sodium, potassium, calcium, zinc, and any combination thereof. For example, the carboxylate may be selected from the group comprising formate, acetate, trifluoroacetate, oxalate, succinate, and any combination thereof. In one or more embodiments, the second compound may be an organic compound selected from the group comprising potassium acetate, sodium acetate, potassium trifluoroacetate, sodium trifluoroacetate and any combination thereof. In one or more embodiments, the second compound may be an inorganic compound selected from the group comprising calcium chloride, sodium bromide, potassium bromide, lithium bromide and any combination thereof. According to these embodiments, the second compound may provide a salting out effect of the non-aqueous conductive liquid and further enhances the non-miscibility between the non-conductive liquid and the non-aqueous conductive liquid. For example, the salting-out effect may be dependent on the second compound concentration.

In one or more embodiments, the non-aqueous conductive liquid may comprise the ionic second compound in an amount of about 10 weight % or less. In one or more embodiments, the non-aqueous conductive liquid may comprise the ionic second compound in an amount of about 5 weight % or less, such as for example from 2 weight % to 5 weight %. In one or more embodiments, the non-aqueous conductive liquid may comprise the ionic second compound in an amount of about 2 weight % or less, and for example about 0.5 weight % or less.

In one or more embodiments, the non-aqueous conductive liquid according to the present disclosure may be highly polar as it comprises a non-ionic polar organic solvent. In addition, the non-aqueous conductive liquid according to the present disclosure may comprise at least 2 weight % of an ionic compound, for example when the first compound is ionic, and for example when non-aqueous conductive liquid comprises from 2 weight % to 5 weight % of the ionic second compound. As a result, a unique salting-out effect is achieved, which allows to reduce or minimize the cross-solubility between the non-aqueous conductive liquid and the non-conductive liquid. For example, adding from 2 weight % to about 5 weight % of an ionic first or second compound, such as a potassium, sodium or ammonium salt of nitrate, trifluoroacetate, acetate or carbonate, may reduce the solubility of the non-conductive liquid in the non-aqueous conductive liquid by 15% or more. Furthermore, the reduced or minimized cross-solubility between the non-aqueous conductive liquid and the non-conductive liquid provides electrowetting devices with highly stable optical performances, even when exposed to higher temperatures, such as temperature higher than 25° C.

In one or more embodiments of the present disclosure, the dielectric enclosure may comprise a compound selected from the group comprising poly-para-xylylene linear polymers, polydimethylsiloxanes, $SiN_3$, $Al_2O_3$, $SiO_2$, and any combination thereof. For example, the dielectric enclosure may comprise substituted or non-substituted poly-para-xylylene polymers. In one or more embodiment, the dielectric enclosure comprises a poly-para-xylylene polymer and/or a fluorinated polymer. In one or more embodiment, the dielectric enclosure may comprise parylene C (poly-chloro-para-xylylene). In one or more embodiment, the dielectric enclosure may comprise fluorinated poly-para-xylylene. In one or more embodiment, the dielectric enclosure may comprise a fluorinated polymer. In one or more embodiment, the dielectric enclosure may be coated with a thin layer of a low surface energy coating such as Teflon®, Cytop®, Fluoropel®. In one or more embodiment, the dielectric enclosure may be coated with Cytop®. In one or more embodiments, the dielectric enclosure may comprise poly-para-xylylene linear polymers and be coated with a layer of a low interfacial energy coating.

A second aspect of the present disclosure is to provide a liquid lens, such as for example a variable focus liquid lens, an optical diaphragm, an optical zoom, an ophthalmic device, comprising an electrowetting optical device according to the present disclosure.

A third aspect of the present disclosure is to provide an apparatus, such as for example a camera, a cell phone, a telemeter, an endoscope, a dental video camera and the like, comprising the liquid lens according to the second aspect.

A fourth aspect of the present disclosure is to provide a method for reducing optical power hysteresis of an electrowetting optical device according to the present disclosure. The method comprises decreasing the interface energy between the non-conductive fluid and the dielectric enclosure by adding from 0.0001 weight percent to about 1 weight percent of a surface adsorbing agent to the non-conductive fluid, the surface adsorbing agent being an amphiphilic molecule having a solubility in water lower than about 0.1 weight percent at 25° C.

A fifth aspect of the present disclosure is to provide a use of a non-conductive liquid according to the present disclosure as a component of an electrowetting optical device.

EXAMPLES

Figure 4:
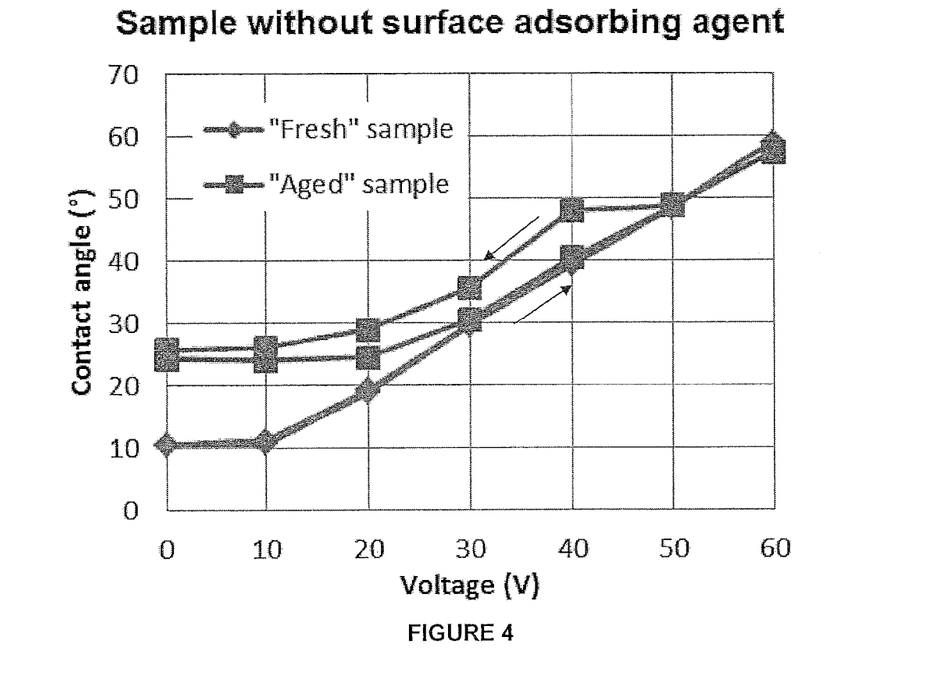
FIG. 4 is a graph showing the evolution of the contact angle θ with respect to the voltage applied on a comparative electrowetting experiment.
Figure 5:
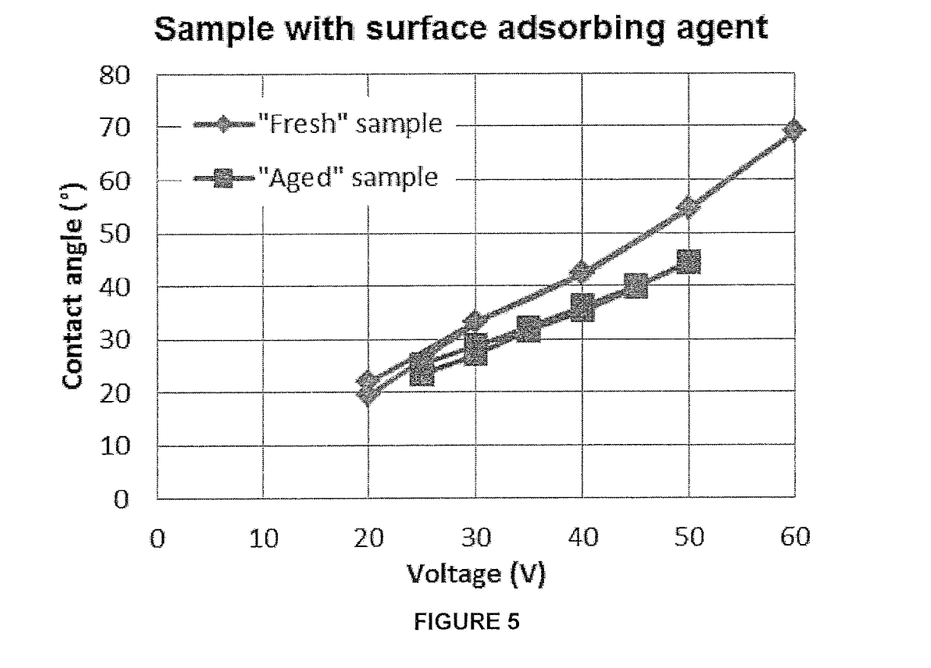
FIG. 5 is a graph showing the evolution of the contact angle θ with respect to the voltage applied on an electrowetting experiment according to the present disclosure.

Surface adsorbing agent efficiency towards ageing and optical power hysteresis prevention is demonstrated by the following electrowetting experiment, which was performed on a planar insulating substrate. For instance, a non-conductive liquid droplet (with and without the surface adsorbing agent) is placed on a dielectric-coated Si wafer in the presence of a conductive liquid. After recording an electrowetting curve (ramping up and down a voltage and measuring the corresponding contact angle θ) of the "fresh" sample, a voltage is applied to the non-conductive liquid droplet for an extended period of time, such as over 24 hours. After removal of the applied voltage, an "aged" electrowetting curve is recorded. If the surface adsorbing agent is not added to the non-conductive liquid or if a non efficient comparative compound is added to the non-conductive liquid, an increase in contact angle hysteresis is observed (i.e. the down curve does not overlap the up curve when the voltage corresponding to the voltage applied for the extended period of time is reached back), as shown in FIG. 4. Conversely, if the non-conductive liquid comprises the surface adsorbing agent, no variation in contact angle hysteresis is observed (i.e. the down curve overlaps the up curve when the voltage corresponding to the voltage applied for the extended period of time is reached back), as shown in FIG. 5. Examples provided in FIG. 4 and FIG. 5 were performed before and after application of 50V AC 1 kHz for 29 h. Formulation example 5 and the reference experiment without the surface adsorbing agent were tested.

In the following, several formulations of non-conductive liquids and conductive liquids according to the present disclosure are provided. The surface adsorbing agents are in italic. These formulations are designed to work particularly but not exclusively on coated dielectric enclosures. Typical coating materials include but are not restricted to parylenes as well as polydimethylsiloxane-like polymers. SIP6827.0® sold by Gelest® is phenyltris(trimethylsiloxy)silane. DBE-224® sold by Gelest® is a polydimethylsiloxane-methoxy-poly(ethyleneoxy)propylmethylsiloxane copolymer comprising about 25 weight percent of ethyleneoxide monomers and having a molecular weight of about 10000 g/mol. DMS-T02® sold by Gelest® is a trimethylsiloxy terminated polydimethylsiloxane having a molecular weight of 410 g/mol. AMS-152® sold by Gelest® is a polydimethylsiloxane-poly(aminopropylmethylsiloxane) copolymer comprising from 4 weight percent to 5 weight percent of aminopropylmethylsiloxanemonomers and having a molecular weight ranging from about 7000 g/mol to about 9000 g/mol. Brij 93® is a polyethylene glycol oleyl ether of linear formula $C_{18}H_{35}(OCH_2CH_2)_nOH$, wherein n≈2. Brij 52® is a Polyethylene glycol hexadecyl ether of linear formula $C_{16}H_{33}(OCH_2CH_2)_nOH$, wherein n≈2. Brij S2® is a Polyethylene glycol octadecyl ether of linear formula $C_{18}H_{37}(OCH_2CH_2)_nOH$, wherein n≈2.

| Formulation 1 | |
|---|---|
| Non-conductive liquid: | |
| Phenyltrimethylgermane | 62.5 w. % |
| Diphenyldimethylgermane | 26.0 w. % |
| Diphenyldimethylsilane | 10.0 w. % |
| *Brij 93 ®* | *0.50 w. %* |
| Conductive liquid: | |
| Potassium acetate | 4.20 w. % |
| Ethylene glycol | 95.8 w. % |

| Formulation 2 | |
|---|---|
| Non-conductive liquid: | |
| Hexaethyldigermane | 56.0 w. % |
| Diphenyldimethylgermane | 37.0 w. % |
| SIP6827.0 ® | 7.00 w. % |
| *DBE-224 ®* | *0.01 w. %* |
| Conductive liquid: | |
| Sodium bromide | 2.00 w. % |
| Ethylene glycol | 98.0 w. % |

| Formulation 3 | |
|---|---|
| Non-conductive liquid: | |
| Hexamethyldigermanium | 47.0 w. % |
| Hexaethyldigermane | 30.0 w. % |
| Hexamethyldisilane | 3.00 w. % |
| Diphenyldimethylgermane | 20.0 w. % |
| *DBE-224 ®* | *0.011 w. %* |
| Conductive liquid: | |
| Potassium acetate | 0.10 w. % |
| Ethylene glycol | 79.9 w. % |
| Glycerol | 20.0 w. % |

| Comparative formulation 3 | |
|---|---|
| Non-conductive liquid: | |
| Hexamethyldigermanium | 47.0 w. % |
| Hexaethyldigermane | 30.0 w. % |
| Hexamethyldisilane | 3.00 w. % |
| Diphenyldimethylgermane | 20.0 w. % |
| Conductive liquid: | |
| Potassium acetate | 0.10 w. % |
| Ethylene glycol | 79.9 w. % |
| Glycerol | 20.0 w. % |

| Formulation 4 | |
|---|---|
| Non-conductive liquid: | |
| DMS-T02 ® | 48.0 w. % |
| Hexaethyldigermane | 52.0 w. % |
| *AMS-152 ®* | *0.005 w. %* |
| Conductive liquid: | |
| Water | 99.9 w. % |
| Sodium sulfate | 0.10 w. % |

| Formulation 5 | |
|---|---|
| Non-conductive liquid: | |
| Hexamethyldigermanium | 36.0 w. % |
| Hexaethyldigermane | 61.9 w. % |
| Hexamethyldisilane | 2.00 w. % |
| *DBE-224* | *0.10 w. %* |
| Conductive liquid: | |
| Potassium acetate | 0.10 w. % |
| Ethylene glycol | 79.9 w. % |
| Glycerol | 20.0 w. % |

| Comparative formulation 5 | |
|---|---|
| Non-conductive liquid: | |
| Hexamethyldigermanium | 36.0 w. % |
| Hexaethyldigermane | 62.0 w. % |
| Hexamethyldisilane | 2.00 w. % |
| Conductive liquid: | |
| Potassium acetate | 0.10 w. % |
| Ethylene glycol | 79.9 w. % |
| Glycerol | 20.0 w. % |

| Formulation 6 | |
|---|---|
| Non-conductive liquid: | |
| Phenyltrimethylgermane | 99.9 w. % |
| *Brij 93 ®* | *0.10 w. %* |
| Conductive liquid: | |
| Potassium acetate | 4.20 w. % |
| Ethylene glycol | 95.2 w. % |

| Comparative formulation 6 | |
|---|---|
| Non-conductive liquid: | |
| Phenyltrimethylgermane | 100 w. % |
| Conductive liquid: | |
| Potassium acetate | 4.20 w. % |
| Ethylene glycol | 95.2 w. % |

Surface adsorbing agent efficiency towards optical power hysteresis prevention is also demonstrated by the following electrowetting experiments. In the following examples, comparative formulation 6 (FIGS. 6 and 8), formulation 6 (FIGS. 7 and 8), comparative formulation 3 (FIG. 9) and formulation 3 (FIG. 10) were used in the production of liquid lenses prototypes, and the optical curves (optical power versus voltage) were recorded (ramping up and down a voltage and measuring the corresponding optical power).

Figure 6:
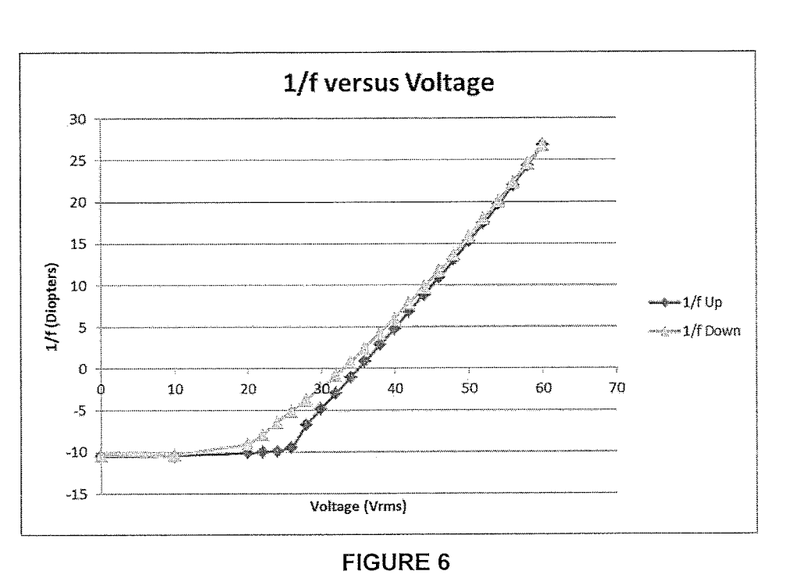
FIG. 6 is a graph showing the evolution of the optical power in dioptries with respect to the voltage applied on a comparative electrowetting optical device.
Figure 7:
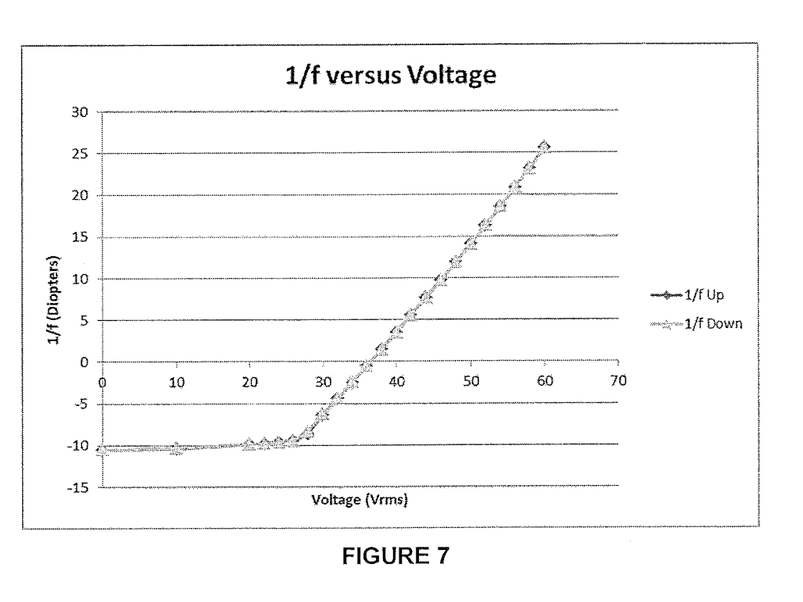
FIG. 7 is a graph showing the evolution of the optical power in dioptries with respect to the voltage applied on an electrowetting optical device according to the present disclosure.
Figure 8:
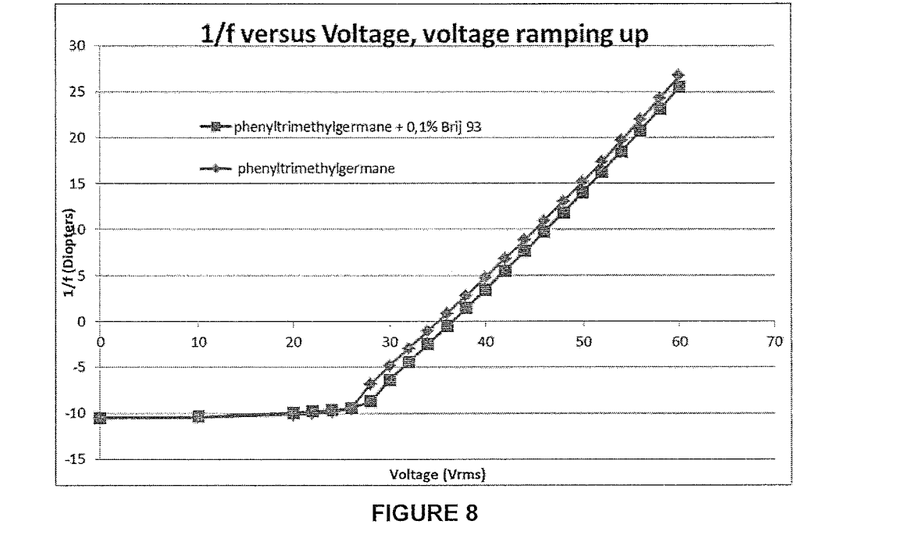
FIG. 8 is a graph showing the evolution of the optical power in dioptries with respect to increasing voltage applied on an electrowetting optical device according to the present disclosure compared to a reference electrowetting device.

As shown in FIG. 6 (comparative formulation 6) and FIG. 7 (formulation 6), the presence of the surface adsorbing agent (namely, Brij 93® in this example) decreases greatly optical power hysteresis (1/f Up curve superimposed with 1/f Down curve). As a further improvement, it is also noted from FIG. 8 that the lowering of the control voltage obtained by adding the wetting agent is negligible (the slopes of the two curves are identical given the measurement uncertainty).

Figure 9:
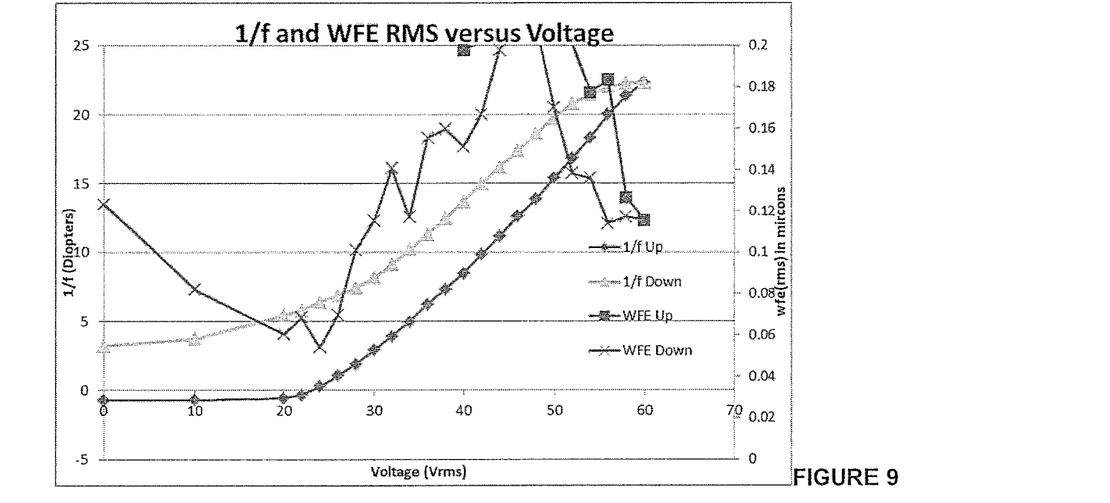
FIG. 9 is a graph showing the evolution of the optical power in dioptries and the wave front error (WFE) rms (root mean square) (optical quality) in microns with respect to the voltage applied on a comparative electrowetting optical device.
Figure 10:
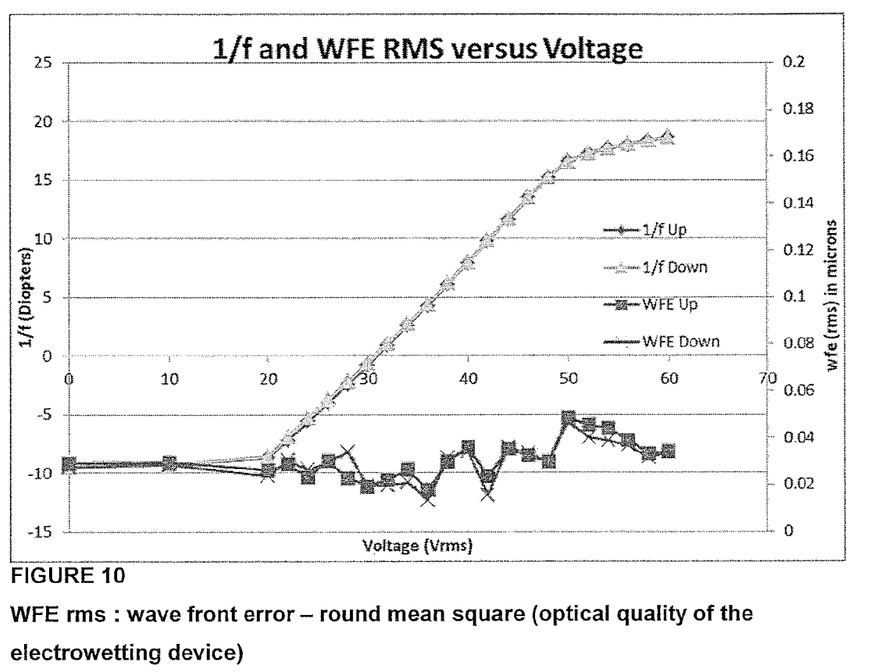
FIG. 10 is a graph showing the evolution of the optical power in dioptries and the wave front error rms (optical quality) in microns with respect to the voltage applied on an electrowetting optical device according to the present disclosure.

As shown in FIG. 9 (comparative formulation 3) and FIG. 10 (formulation 3), the presence of the surface adsorbing agent (namely, DBE-224® in this example) decreases greatly optical power hysteresis (1/f Up curve superimposed with 1/f Down curve). As a further improvement, it is also noted from FIGS. 9 and 10 that the presence of the surface adsorbing agent greatly improves the optical quality of the exemplary electrowetting optical device (lower wave front errors of FIG. 9 with respect to FIG. 10). Also, it is noted from FIG. 9 that the presence of the surface adsorbing agent greatly improves the OFF (without application of voltage) optical power of the electrowetting optical device. Indeed, when the electrowetting optical device is OFF, the optical power is about 0 D when the non-conductive liquid does not comprise the surface adsorbing agent (see FIG. 8), and when the electrowetting optical device is OFF, the optical power is about—8 D when the non-conductive liquid comprises the surface adsorbing agent (see FIG. 9).

As a further example, the Applicant has found that adding the surface adsorbing agent in a reference non-conductive liquid (e.g. pure phenyltrimethylsilane) in an amount not higher than 1 weight percent, is sufficient to lower the contact angle of the non-conductive liquid on the surface of the dielectric enclosure by at least 5° in the presence of a reference conductive liquid (e.g. pure ethylene glycol). For example, the contact angle θ between phenyltrimethylsilane and ethylene glycol is 23°±2° on parylene C. When, 1 weight percent of the surface adsorbing agent is added the contact angle θ between 1 w. % of the surface adsorbing agent in 99 w. % of phenyltrimethylsilane on parylene C in the presence of ethylene glycol is lowered to 18° or below. For example, Brij 52®, Brij 93®, Brij S2® may be successfully used in the non-conductive liquid in a small amount of about 0.5 weight percent to lower the contact angle θ below 18°. In the same manner, DBE-224® or other polydimethylsiloxane-methoxypoly(ethyleneoxy)propylmethylsiloxane copolymers with a hydrosolubility lower than 0.1 weight %, AMS-152®, dodecanol, Coconut oil fatty acid ethanolamide, Aerosol OT®, lecithin and Di-(Palm Carboxyethyl) Hydroxyethyl Methylammonium Methosulfate (commercial Rewoquat WE28 sold by Evonik®) have been successfully tested and are also able to lower the contact angle θ below 18° when added in amounts not higher than 1 weight percent in the non-conductive liquid.

Although the above-mentioned examples have been described in detail, it is understood that alternative embodiments of the disclosure can be envisaged. Thus, for example, non-conductive liquids comprising a surface adsorbing agent other than Brij 52®, Brij 93®, Brij S2®, AMS-152®, DBE-224®, dodecanol, Coconut oil fatty acid ethanolamide, Aerosol OT®, lecithin and Di-(Palm Carboxyethyl) Hydroxyethyl Methylammonium Methosulfate may be used to provide an electrowetting optical device according to the present disclosure. In addition, various compositions with respect to the non-conductive liquid and the conductive liquid may be envisaged to obtain an electrowetting optical device according to the present disclosure. So for example, water based conductive liquids (e.g. formulation 4) or non-aqueous conductive liquids may be envisaged to provide an electrowetting optical device according to the present disclosure.

To resume, with a non-conductive liquid formulation containing a surface adsorbing agent according to the present disclosure, the Applicant has found that it is now possible to produce electrowetting optical devices having low optical power hysteresis and high optical quality even when the non-conductive liquid has a contact angle θ higher than 20° with respect to the dielectric enclosure in the presence of the conductive liquid. The Applicant have also found that electrowetting optical devices comprising a surface adsorbing agent according to the present disclosure in the non-conductive liquid provide highly stable, resilient and long-lived optical performances.

The invention claimed is:

1. An electrowetting optical device comprising:
a conductive liquid and a non-conductive liquid, said liquids being non miscible; and
a dielectric enclosure on which both fluids are in contact and form a triple interface,
wherein the non-conductive liquid comprises from 0.0001 weight percent to about 1 weight percent of a surface adsorbing agent, the surface adsorbing agent being an amphiphilic molecule having a solubility in water lower than about 0.1 weight percent at 25° C.

2. The electrowetting optical device according to claim 1, wherein the surface adsorbing agent is configured to form a protective layer on the dielectric enclosure; and/or decrease the optical power hysteresis of the electrowetting optical device; and/or prevent a drift of the optical power causing hysteresis during aging of the electrowetting optical device; and/or decrease by at least 5° the contact angle of the non-conductive liquid on the surface of the dielectric enclosure in the presence of the conductive liquid.

3. The electrowetting optical device according to claim 1, wherein the surface adsorbing agent is identified via a first reference experiment consisting of:
measuring a contact angle of a mixture of 0.0001 to 1 weight % of the surface adsorbing agent in phenyltrimethylsilane on parylene C in the presence of ethylene glycol, the measured contact angle being 18° or less; and/or
wherein the surface adsorbing agent is identified via a second reference experiment consisting of:
depositing a drop of the non-conductive liquid containing 0.0001 to 1 weight % of the surface adsorbing agent on the dielectric enclosure in the presence of the conductive fluid;
recording a contact angle hysteresis before a continuous application of a voltage between the conductive liquid and an electrode placed under the dielectric enclosure;
continuously applying an AC 1 kHz square voltage for at least 24 h between the conductive liquid and the electrode, said voltage being chosen to induce a variation of at least 20° of the contact angle without saturation; and
recording a contact angle hysteresis after the continuous application of the voltage, a difference between the contact angle hysteresis before and after application of the voltage being lower than 5°.

4. The electrowetting optical device according to claim 1, wherein the surface adsorbing agent is selected from the group consisting of:
a dialkylsiloxane polymer or copolymer; a polyethoxylated alkylphenol; a polyol fatty acid ester; a C8 to C18 fatty alcohol; a polyethoxylated fatty alcohol; a dialkyl sodium sulfosuccinate; a glycerophospholipid; and a mixture thereof.

5. The electrowetting optical device according to claim 4, wherein the dialkylsiloxane polymer or copolymer comprises more than 20 dialkylsiloxane units, and/or has a molecular weight ranging from about 3000 g/mol to about 15000 g/mol.

6. The electrowetting optical device according to claim 4, wherein the alkyl groups of the dialkylsiloxane are identical or different and comprise less than 12 carbon atoms, and/or are each saturated or unsaturated and are each a linear, cyclic or branched hydrocarbon group.

7. The electrowetting optical device according to claim 4, wherein the surface adsorbing agent is selected from the group consisting of a polydimethylsiloxane-polyethyleneoxide copolymer, a polyalkylmethylsiloxane-hydroxypolyalkyleneoxypropylmethylsiloxane copolymer, a polydimethylsiloxane-hydroxypolyethyleneoxypropylmethylsiloxane copolymer, a polydimethylsiloxane-methoxypolyethyleneoxypropylmethylsiloxane copolymer, a polydimethylsiloxane-alcoxypolyethyleneoxypropylmethylsiloxane copolymer, a polydimethysiloxane-poly aminopropylmethylsiloxane copolymer, a hydroxyl terminated polydimethylsiloxane polymer, a hydroxyl terminated polydimethylsiloxane-polyalkylmethylsiloxane copolymer, a hydroxyl terminated polydimethylsiloxane-polydiphenylsiloxane copolymer, and a mixture thereof.

8. The electrowetting optical device according to claim 4, wherein the surface adsorbing agent is a polyethoxylated nonylphenol or lecithin.

9. The electrowetting optical device according to claim 4, wherein the polyethoxylated fatty alcohol is a C16-C18 polyethoxylated fatty alcohol.

10. The electrowetting optical device according to claim 4, wherein the polyol fatty acid ester is a sorbitan fatty acid ester and/or a polyol of a C16-C22 fatty acid.

11. The electrowetting optical device according to claim 4, wherein the C8-C18 fatty alcohol is dodecanol, or is fluorinated or perfluorinated.

12. A liquid lens comprising the electrowetting optical device according to claim 1.

13. An apparatus comprising the liquid lens according to claim 12.

* * * * *

UNITED STATES PATENT AND TRADEMARK OFFICE
CERTIFICATE OF CORRECTION

PATENT NO.         : 9,864,186 B2
APPLICATION NO.    : 14/801346
DATED              : January 9, 2018
INVENTOR(S)        : Géraldine Malet et al.

It is certified that error appears in the above-identified patent and that said Letters Patent is hereby corrected as shown below:

In the Claims

In Column 20, Line 26, Claim 7, delete "alcoxy" and insert -- alkoxy --, therefor.

In Column 20, Lines 27-28, Claim 7, delete "polydimethysiloxane" and insert -- polydimethylsiloxane --, therefor.

Signed and Sealed this
Fourteenth Day of May, 2024

Katherine Kelly Vidal
*Director of the United States Patent and Trademark Office*